United States Patent [19]

van Dorp et al.

[11] E Re. 29,961

[45] Reissued Apr. 10, 1979

[54] CURABLE POWDER COATING COMPOSITION COMPRISING A MIXTURE OF AN ALKOXYLATED POLYAMIDE-ALDEHYDE RESIN AND A POLYESTER RESIN

[75] Inventors: Cornelis van Dorp, Amersfoort; Nantko Kloos, Heino; Frits Visser, Zwolle, all of Netherlands

[73] Assignee: Internationale Octrooi Maatschappij Octropa B.V., Netherlands

[21] Appl. No.: 593,405

[22] Filed: Jul. 7, 1975

Related U.S. Patent Documents

Reissue of:

[64] Patent No.: 3,624,232
Issued: Nov. 30, 1971
Appl. No.: 5,941
Filed: Jan. 26, 1970

U.S. Applications:

[63] Continuation of Ser. No. 419,463, Nov. 27, 1973, abandoned.

[30] Foreign Application Priority Data

Jan. 28, 1969 [LU] Luxembourg ..... 57855

[51] Int. Cl.[2] ..... B05D 3/02

[52] U.S. Cl. ..... 427/195; 260/850; 427/27

[58] Field of Search ..... 427/195, 27; 428/482, 428/524; 260/850

[56] References Cited

U.S. PATENT DOCUMENTS

| | | | |
|---|---|---|---|
| 2,462,658 | 2/1949 | Moffett | 260/850 X |
| 3,108,083 | 10/1963 | Laganis | 260/850 X |
| 3,211,695 | 10/1965 | Peterson | 117/21 |
| 3,278,636 | 10/1966 | Wynstra | 117/132 B |
| 3,291,858 | 12/1966 | Osterhof et al. | 260/850 |
| 3,310,431 | 3/1967 | Loose | 427/195 |
| 3,337,486 | 8/1967 | Torres | 427/195 |
| 3,382,295 | 5/1968 | Taylor et al. | 117/21 |
| 3,410,926 | 11/1968 | Hicks | 117/132 BE |
| 3,438,849 | 4/1969 | Isack | 117/21 |
| 3,504,431 | 4/1970 | Guilbault et al. | 117/21 |
| 3,538,186 | 11/1970 | Payette | 260/850 |
| 3,549,403 | 12/1970 | Williams et al. | 427/195 |
| 3,668,275 | 6/1972 | Riemhofer et al. | 260/850 |
| 3,704,255 | 11/1972 | Braun | 428/482 |

FOREIGN PATENT DOCUMENTS

| | | | |
|---|---|---|---|
| 559963 | 7/1958 | Canada | 260/850 |
| 1015165 | 9/1957 | Fed. Rep. of Germany | 260/850 |

*Primary Examiner*—Shrive P. Beck
*Attorney, Agent, or Firm*—Pollock, Vande Sande & Priddy

[57] ABSTRACT

Curable powder coating resin compositions comprise a small proportion of an alkoxylated polyamine-aldehyde resin and a polyester resin having an acid number below 20, a [melting] *softening* point between 60° and 130° C., the acid component comprising a dibasic armoatic carboxylic acid and the alcohol component comprising diols such as 2,2-di(4-beta-hydroxyethyoxy-phenyl-) propane, certain glycidyl esters and certain dihydric aliphatic alcohols.

The curable powder-coating composition is applied to a substrate by a powder-coating process and the coated substrate is heated to a temperature of from 120° to 220° C. for 10 to 60 minutes.

37 Claims, No Drawings

CURABLE POWDER COATING COMPOSITION COMPRISING A MIXTURE OF AN ALKOXYLATED POLYAMIDE-ALDEHYDE RESIN AND A POLYESTER RESIN

Matter enclosed in heavy brackets [ ] appears in the original patent but forms no part of this reissue specification; matter printed in italics indicates the additions made by reissue.

*This is a continuation of prior copending application Ser. No. 419,463, filed Nov. 27, 1973, which is now abandoned.*

This invention relates to a curable coating composition which is suitable for application by a fusion process and is particularly concerned with homogeneous, pulverulent coating compositions suitable for application in powder spray applications and fluidized bed-coating processes.

Generally curable coating compositions are in the form of a solution of a synthetic resin in an organic solvent serving as a carrier. This solution is applied to the base surface, which may be metal, wood, paper or textile, and then the solvent carrier is evaporated and a synthetic resin film remains, which then may be subjected to a heat-hardening treatment.

The use of organic solvents as a carrier for the synthetic resin has the disadvantage that in most cases the solvents are inflammable or even may give rise to explosions. Moreover some organic solvents are physiologically unacceptable, as they endanger the health of operators. In addition, much energy is required for the evaporation of the organic solvent and for the conditioning of the air which must carry away the solvent vapors from the oven in which the coated objects are baked.

For these reasons it has been proposed to replace the organic solvents wholly or partially by water. The use of water as a carrier for the synthetic resin, however, dictates the use of certain types of synthetic resins, which might not impart the required technological properties, such as flow, levelling and gloss to the finished coatings.

In view of the disadvantages of the preceding methods, it has also been proposed to apply high-melting thermoplastic, noncurable coating compositions in the form of a homogeneous powder. This powder is mostly applied by the method known as the fluidized bed method. This method is essentially a dipping proess wherein the article to be coated is preheated to a temperature above the melting point of the coating composition and then introduced into a fluidized mass of coating composition powder particles.

Powdered thermosetting, curable coating compositions may be applied to the substrate in the same way, requiring however, two heat treatments, first the preheating of the object to be coated and subsequently the curing treatment of the coated object. Therefore, the electrostatic powder spray application method has been developed, in which only one heat treatment is required, namely the curing treatment, and this method has the additional advantage that thinner layers (less than 100 microns) can be applied. Due to the relatively high viscosity of the molten powder [even in one treatment], coatings are provided *even in one treatment* which are substantially thicker than can be obtained by the conventional coating methods using solutions of the coating material. Sharp edges or bends are also much better coated by the powder-coating processes.

[It has been proposed in German patent specification 1,015,165 to prepare solvent-based, curable coating compositions, especially enamels and stoving lacquers, consisting of 20–60 percent by weight of alkoxylated melamine-formaldehyde or urea-formaldehyde resin and 40–80 percent by weight of a linear polyester resin. This polyester resin is prepared from a saturated or unsaturated, aliphatic or aromatic dicarboxylic acid and an aromatic dihydric alcohol having the general formula:]

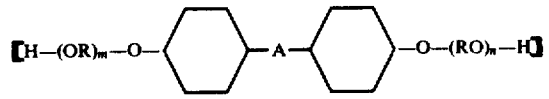

[in which A is a 2-alkylidene radical having three or four carbon atoms, R is an alkylene radical having two or three carbon atoms and m and n are always at least one and the average sum of m and n is not greater than three. Small amounts of other dihydric alcohols may be admixed with the aromatic diol.]

[According to column 2, lines 28 to 39 of this specification it is preferred to use equimolar amounts of acid and alcohol with preparation of the polyester, whereas in some instances 1.2 moles of alcohol per mole of acid is used. Only in example 5 is the preparation of the polyester quantitatively described, viz. from 1.15 moles of propoxylated bisphenol A (2.2 moles of propylene oxide per mole of bisphenol A) and 1 mole of fumaric acid, 85 parts of a 50 percent by weight solution of this polyester resin are then mixed with 15 parts of a 50 percent by weight solution of butoxylated melamine-formaldehyde resin. The resin composition thus obtained, however, is unsuitable for application in the powder-coating method, even if solvent-free.]

[None of the polyester resins which are only qualitatively described in the examples, upon combination with the alkoxylated melamine-formaldehyde or urea-formaldehyde resins in the specified weight ratios give a resin composition, suitable for application by a fusion process.]

Various pulverant thermosetting coating compositions intended for use in the powder-coating method have been suggested heretofore. As such may be mentioned epoxy resins. Also polyester resins have been proposed for use in the powder-coating process. None of these thermosetting resin-coating compositions, however, have been completely satisfactory and hence there is still the need of a coating composition suitable for use in electrostatic powder spray-coating processes, which provides a uniform coating having satisfactory chemical and mechanical properties.

It is an object of the present invention to provide curable coating compositions which are suitable for application by a fusion process and particularly to provide homogeneous, pulverulent curable coating [composition] *compositions* which are especially suitable for use in powder spray-coating processes and which upon application provide uniform coatings having good mechanical properties.

Accordingly the present invention provides a curable powder-coating composition, comprising a mixture of 3 percent to 15 percent by weight of an alkoxylated polyamine-aldehyde resin and 85 percent to 97 percent by weight of a polyester resin having an acid number below 20 and a softening point falling within the range between 60° C. and 130° C., of which the acid component comprises a dibasic, aromatic carboxylic acid and of which the alcohol component comprises:

a. from 0 to 100 mole percent (based on the total alcohol component of the polyester) of an alcohol having the general formula:

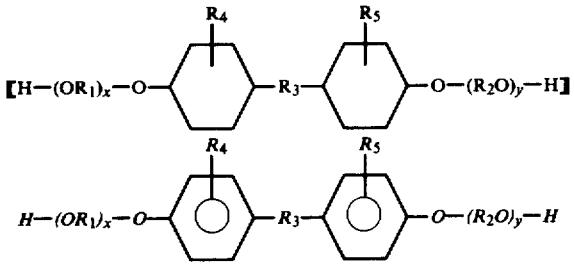

in which $R_1$ and $R_2$ represent alkylene groups having from two to four carbon atoms, $R_3$ represents an alkylidene group having three or four carbon atoms or a cycloalkylidene group having six carbon atoms, or a carbonyl group, or a sulfone group, x and y are numerals each being at least one, the sum of x and y being not greater than six, $R_4$ and $R_5$ represent a hydrogen atom or alkyl radical having from one to six carbon atoms:

b. from 0 to 40 mole percent (based on the total alcohol component of the polyester) of a glycidyl ester having the general formula:

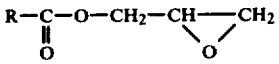

in which R is a straight or branched chain, saturated or unsaturated alkyl group having from four to 20 carbon atoms, or a substituted or unsubstituted benzene nucleus, and c. from [5] *0* to 100 mole percent (based on the total alcohol component of the polyester) of at least one dihydric, aliphatic alcohol, the sum of the alcohol components (a), (b) and (c) being 100 mole percent, said curable coating composition having a good powder stability, as hereinbefore defined.

As the dibasic, aromatic carboxylic acid in the acid component of the polyester may be used: ortho-phthalic acid, terephthalic acid isophthalic acid, esters of these acids with lower aliphatic, monohydric alcohols [such as methanol, or ethanol, and halogen-substituted or hydrogenated derivatives of these acids] such as methanol, or ethanol, and halogen-substituted or hydrogenated derivatives of these acids, such as hexachlorophthalic acid, tetrahydrophthalic acid, endomethylene-tetrahydrophthalic acid or hexachloro-endomethylene-orthophthalic anhydride. Also the esters of the halogen-substituted or hydrogenated derivatives of their acids with lower aliphatic, monohydric alcohols such as methanol, or ethanol or the anhydrides of these derivatives may be used. *Another useful derivative of dibasic aromatic carboxylic acid is hexachloroendomethylene tetrahydrothalic acid.* The dibasic, aromatic acids may be used either singly or in combination with one another. The preferred dibasic aromatic acid is terephthalic acid. It has in some cases been found advantageous to use up to 10 mole percent (based on the total acid component) of a polybasic, aliphatic carboxylic acid, such as adipic acid, or of [a] *an at least* tribasic, aromatic carboxylic acid, such as trimellitic acid or pyromellitic acid.

Examples of the diols forming component (a) of the polyester resin *in which $R_1$ and $R_2$ represent alkylene groups having from two to three carbon atoms* include, 2,2-di-(4-beta-hydroxyethoxyphenyl)-propane; 2,2-di-(4-beta-hydroxyethoxyphenyl)-butane; 2,2-di-(4-hydroxypropoxyphenyl)-propane; 2,2-di-(3-methyl-4beta-hydroxyethoxyphenyl)-propane; the polyoxyethylene or polyoxypropylene ether of 4,4-isopropylidene diphenol, wherein both phenolic groups are oxyethylated or oxypropylated and the average number of oxyethylene or oxypropylene groups is from 2 to 6; di(4-beta-hydroxyethoxy-phenyl)-ketone and di-(4-beta-hydroxypropoxyphenyl)-ketone.

The preferred diols are 2,2-di-(4-beta-hydroxyethoxy-phenyl-)propane and 2,2-di-(4-hydroxypropoxy-phenyl-)propane.

The alcohol component (b) of the polyester comprises glycidyl esters and those that can be used include, lauric acid glycidyl ester, benzoic acid glycidyl ester and glycidyl esters of saturated aliphatic monocarboxylic acids having tertiary or quaternary carbon atoms in alpha-position to the carboxyl groups (available under the trade name of "Versatic Acids"). These latter glycidyl esters are preferred.

The alcohol component (c) of the polyester comprises dihydric aliphatic alcohols such as 2,2-dimethylpropanediol-1,3, propylene glycol, ethylene glycol. The dihydric aliphatic alcohols may be used either singly or in combination with one another.

It has in some instances been found advantageous to use up to 10 mole percent (based on the total alcohol component) of aliphatic trihydric or polyhydric alcohols, such as trimethylol propane and pentaerythritol. In all cases the sum of the alcohol components (a), (b) and (c) is 100 mole percent.

The polyester resins are prepared by the general techniques employed in the preparation of polyester resins. They can be conveniently made by heating all the reactants, while stirring, up to a temperature of 240° C., whilst an inert gas (e.g. nitrogen) is continuously passed through the reaction mixture to remove the water formed during the esterification reaction. At the end of the esterification reaction, vacuum is applied of about 100 mm. Hg and the ester is polymerized and glycol is distilled off.

The polyester resin which has an acid number below 20 and a softening point falling within the range between 60° and 130° C. (modified ball and ring test) is mixed with an alkoxylated polyamine-aldehyde resin in a weight ratio of polyester resin to polyamine-aldehyde resin between 85:15 and 97:3 and preferably between 90:10 and 95:5. The resin mixture obtained will generally have a [melting] *softening* point between about 60° and about 120° C. (modified ball and ring test), whilst by the application of the preferred conditions the [melting] *softening* point will be between about 80° and about 110° C. (modified ball and ring test). In all cases, however, the resin mixture obtained has a good powder stability as hereafter defined.

The alkoxylated polyamine-aldehyde resin is in general a thermosetting aminoplast condensate, which is the alkoxylated condensation product of an aldehyde, preferably formaldehyde, with a polyamine compound, such as urea, aminotriazines, such as melamine, or substituted aminotriazines, such as benzoguanamine.

The alkoxylation may be carried out with aliphatic alcohols having from one to six carbon atoms, mixtures of alcohols may also be used. The manufacture of these alkoxylated polyamine-aldehyde resins is well known in the art.

In preparing the preferred homgeneous, pulverant coating compositions according to the present invention, the polyester resin and the methoxylated polyamine-aldehyde resin are mixed at a temperature just about their [melting] *softening* points for example, in an extruder, cooled to solidify the mixture and subsequently crushed and ground in a suitable grinding device such as a pin disc mill to a free-flowing powder having a particle-size range of approximately 20–150 microns. The free-flowing powder so obtained may be subjected to a screening treatment to adjust the desired average particle size, for the specific type of application to be employed.

The homogeneous, pulverulent coating compositions obtained may also include various well-known functional modifiers such as grinding aids, curing agents or accelerators, flow control agents, surface-active agents, heat-stable organic or inorganic pigments, inert fillers, inhibitors, abrasives and plasticizers in their usual effective proportions.

Also small amounts of other resins or other organic compounds to improve the film-forming properties may be incorporated. It will be understood that the amount of these substances must be such that the physical properties of the powders and cured coating are not impaired.

After application of the coating compositions to the substrate, the coatings are cured at a temperature from 120° to [250° C.] *220° C.* for a period of 10 to 60 minutes. The curing treatment is preferably carried out for 20 to 40 minutes at 150° to 200° C.

The invention will be further illustrated by the following examples. In these examples and in the appended claims all softening points were determined by a modified version of the ball and ring method according to A.S.T.M. Specification Number E 28–58 T. The method is modified in that as the first temperature is noted the temperature at which the ball begins to move and as the last temperature, the temperature at which the ball strikes the bottom plate. In view of the application as powder coating, it has been found advantageous for the judgment of the characteristics of the polyester resin and of the complete coating composition to use these figures, rather than those set out in the A.S.T.M. Specification mentioned above.

EXAMPLE 1

Into a suitable reaction vessel equipped with thermometer, stirrer, reflux condenser and inert gas inlet and outlet tubes, are introduced 309.6 g. (0.9 g. mol) of the diether of propylene glycol and bisphenol A, 50 g. (0.2 g. mol) of Cardura-E (Registered Trade Mark; glycidyl ester of branched chain monocarboxylic acids having from nine to 11 carbon atoms) and 166 g. (1.0 g. mol) of terephthalic acid. The contents of the vessel are heated to a temperature of about 220° to 260° C. and held at that temperature while stirring, whereby the water of the esterification reaction is removed from the reaction mass by bubbling nitrogen gas through it. The heating is continued until an acid number of 15 is reached. The polyester resin obtained had a softening point of 85°–110° C.

EXAMPLES 2–7

In the same apparatus as described in example 1 a number of polyester resins were prepared, using the ingredients as summarized in table 1. The acid numbers (AN) and softening points (SP) in °C. of the polyester resins obtained are also indicated in table I.

TABLE I

| Example | Alcohol | Moles alcohol | Acid | Moles acid | AN | SP.° C. |
|---|---|---|---|---|---|---|
| 2 | DEGBA[1] | 1.1 | TPA[2] | 1.0 | 6.4 | 84–103 |
| 3 | DEGBA<br>Cardura E[3] | 0.9<br>0.2 | TPA | 1.0 | 7 | 78–96 |
| 4 | DEGBA<br>Cardura E | 0.9<br>0.2 | HET-acid[4] | 1.0 | 7 | 88–108 |
| 5 | DEGBA<br>Cardura E | 0.7<br>0.4 | IPA[5] | 1.0 | 6 | 70–86 |
| 6 | DEGBA<br>Cardura E<br>TMP[6] | 0.70<br>0.40<br>0.10 | TPA | 1.0 | 0.88 | 67–88.5 |
| 7 | DEGBA<br>Glycidyl benzoate | 0.90<br>0.20 | TPA | 1.0 | 8 | 92–107 |

[1]DEGBA = Diether of ethylene glycol and bisphenol A.
[2]TPA = Terephthalic acid.
[3]Cardura E (Registered Trademark) = Glycidyl ester of branched chain monocarboxylic acids having about 9 to 11 carbon atoms.
[4]HET-acid = Hexachloroendomethylenetetrahydrophthalic acid.
[5]IPA = Isophthalic acid.
[6]TMP = Trimethylolpropane.

EXAMPLES 8–11

With the aid of the polyester resin prepared in example 3, a number of coating compositions were prepared by mixing this polyester resin with hexamethoxymethylmelamine (HMMM) resin in varying amounts (table II).

The "powder stability" as indicated throughout this application, in the examples and the appended claims was determined as follows:

20 g. of the unpigmented, pulverulent composition (of which 80–90 percent had a particle size between 70 and 100 $\mu$) was heated in a glass beaker at 40° C. for $2\times24$ hours. If the resin particles were not sintered together, the powder stability was rated as good (G). If the particles were sintered together the powder stability was rated as bad (B).

The "flexibility" was determined on the basis of specimens of 1 mm. thickness mild steel panels, upon which an amount of the pulverulent resin mixture was applied by the electrostatic spray-coating method, such that on subsequent curing at 180° C. for 30 minutes a uniform coating having a thickness of about 50 mμ was obtained.

Flexibility was rated as passing (P) or failing (F), depending upon whether or not the steel panel with the coating could be bent 180° over a ⅜-inch diameter mandrel without impairing the coating. If the film cracked or broke, it was rated as failing.

The 'shock resistance' indicated was determined with the "Erichsen Schlagpruefgeraet" according to German Specification DIN 53,156 with the specimens as indicated under "flexibility."

Table II

| Example | 8 | 9 | 10 | 11 |
|---|---|---|---|---|
| Polyester resin (wt. %) | 97 | 94 | 90 | 85 |
| HMMM resin (wt.%) | 3 | 6 | 10 | 15 |
| [Melting] | | | | |
| *Softening* point °C. | 76°-103° | 74°-104° | 70°-93° | 65°-91° |
| Powder stability | G | G | G | B |
| Flexibility | F | P | P | P |
| Shock resistance in mm. | 2-3 | 6 | >6 | >6 |

EXAMPLES 12-18

In the same apparatus as described in example 1 a number of polyester resins were prepared, using the ingredients and having the properties as summarized in Table III.

Table III

| Ex. | Alcohol | Moles Alcohol | Acid | Moles Acid | AN | SP° C. |
|---|---|---|---|---|---|---|
| 12 | DEGRA | 0.675 | TPA | 1 | 6.6 | 83-108 |
| | Cardura E | 0.200 | | | | |
| | Neopentyl glycol | 0.225 | | | | |
| 13 | DEGBA | 0.55 | TPA | 1 | 10.2 | 86-104 |
| | Ethylene glycol | 0.55 | | | | |
| 14 | Cardura E | 0.2 | TPA | 1 | 7.7 | 84-98 |
| | Neopentyl glycol | 0.3 | | | | |
| | Ethylene glycol | 0.5 | | | | |
| | Hexanediol 1.6 | 0.1 | | | | |
| 15 | DEGBA | 0.06 | TPA | 1 | 4.7 | 87-101 |
| | Cardura E | 0.17 | | | | |
| | Neopentyl glycol | 0.94 | | | | |

With aid of these polyester resins a number of coating compositions were prepared by mixing them with hexamethoxymethylmelamine (HMMM) resin (table IV).

TABLE IV

| Ex. | Polyester from example | Polyester wt. percent | HMMM wt. percent | Powder stability | Flexibility | Shock resistance |
|---|---|---|---|---|---|---|
| 16 | 12 | 90 | 10 | G | P[1] | [1]6 |
| 17 | 13 | 88 | 12 | G | P[2] | [2]5 |
| 18 | 14 | 94 | 6 | G | P[3] | [3]6 |
| 19 | 15 | 90 | 10 | G | P[4] | [4]2-3 |

[1]Coating thickness, 25 mμ.
[2]Coating thickness, 100 mμ.
[3]Coating thickness, 60 mμ.
[4]Coating thickness, 50-60 mμ.

What is claimed is:

1. [A curable powder coating composition,] *A fusible pulverulent solid mixture prepared by bringing together alkoxylated polyamine-aldehyde resin and polyester resin having a softening point in the range of 60° C. to 130° C., and mixing said resins sufficiently at a temperature above the softening point thereof to form a homogeneous mixture while retaining said mixture in a thermosettable state, said mixture* comprising [a mixture of] 3 percent to 15 percent by weight of [an] alkoxylated polyamine-aldehyde resin and 85 percent to 97 percent by weight of [a] polyester resin having an acid number below 20 [and a softening point falling within the range between 60° C. and 130° C.], of which the acid component comprises a dibasic, aromatic carboxylic acid and of which the alcohol component comprises:

a. from 0 to 100 mole percent (based on the total alcohol component of the polyester) of an alcohol having the general formula:

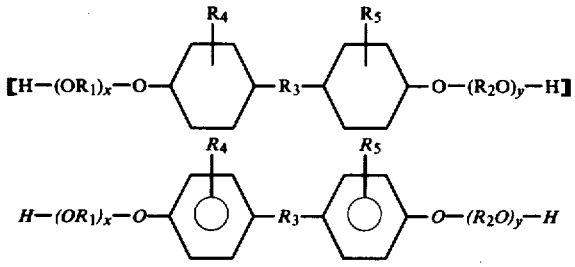

in which $R_1$ and $R_2$ represent alkylene groups having from two to four carbon atoms, $R_2$ represents a group selected from alkylidene groups having three or four carbon atoms, a cycloalkylidene group having six carbon atoms, a carbonyl group and a sulfone group, x and y are numerals each being at least one, the sum of x and y being not greater than six, $R_4$ and $R_5$ represent a group selected from hydrogen atoms and alkyl radicals having from one to six carbon atoms;

b. from 0 to 40 mole percent (based on the total alcohol component of the polyester) of a glycidyl ester having the general formula.

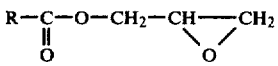

in which R represents a group selected from straight and branched chain, saturated and unsaturated alkyl groups having from four to 20 carbon atoms, a substituted benzene nucleus and an unsubstituted benzene nucleus, and c. from [5] *0* to 1000 mole percent (based on the total alcohol component of the polyester) of at least one dihydric, aliphatic alcohol, the sum of the alcohol components (a), (b) and (c) being 100 mole percent, said curable coating composition having a good powder stability.

2. A curable coating composition, as claimed in claim 1 in which the alcohol component (a) comprises from 0 to 100 mole percent (based on the total alcohol component of the polyester) of an alcohol having the general formula:

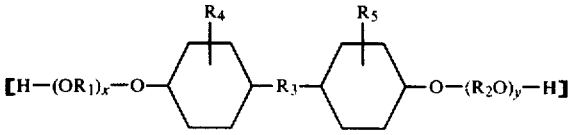

-continued

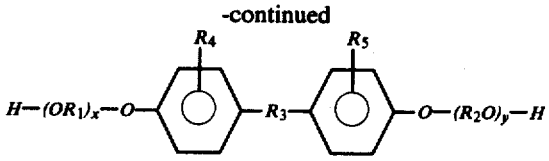

in which $R_1$ and $R_2$ represent alkylene groups having from two to three carbon atoms, $R_1$ represents an alkylidene group having three carbon atoms, x and y are numerals each being at least one, the sum of x and y being not greater than six and $R_4$ and $R_3$ represent hydrogen atoms.

3. A curable coating composition as claimed in claim 1 in which the alcohol component of the polyester comprises:

a. from 0 to 100 mole percent (based on the total alcohol component of the polyester) of a compound selected from the polyoxyethylene and polyoxypropylene ethers of 4,4-isopropylidene diphenol, wherein both phenolic groups are oxyalkenylated and the average number of oxyalkenyl groups is from two to six;

b. from 0 to 40 mole percent (based on the total alcohol component of the polyester) of a glycidyl ester having the general formula:

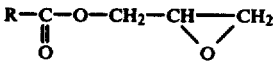

in which R is a branched chain saturated alkyl group having from four to [ten] *twenty* carbon atoms, and c. from [5] *0* to 100 mole percent (based on the total alcohol component of the polyester) of 2,2-dimethylpropanediol-1,3.

4. A curable coating composition, as claimed in claim 1 in which the alkoxylated polyamine-aldehyde resin comprises methoxylated melamine-formaldehyde resin.

5. A curable coating composition, as claimed in claim 2 in which the alkoxylated polyamine-aldehyde resin comprises methoxylated melamine-formaldehyde resin.

6. A curable coating composition, as claimed in claim 3 in which the alkoxylated polyamine-aldehyde resin comprises methoxylated melamine-formaldehyde resin.

7. A process for the preparation of coated substrates, in which a coating composition, comprising the curable coating composition as claimed in claim 1 is applied to a substrate by a powder-coating process and the coated substrate is heated to a temperature of from 120° to 220° C. for 10 to 60 minutes.

8. A process for the preparation of coated substrates, in which a coating composition, comprising the curable coating composition as claimed in claim 2 is applied to a substrate by a powder-coating process and the coated substrate is heated to a temperature of from 120° to 220° C. for 10 to 60 minutes.

9. A process for the preparation of coated substrates, in which a coating composition, comprising the curable coating composition as claimed in claim 3 is applied to a substrate by a powder-coating process and the coated substrate is heated to a temperature of from 120° C. for 220° C. for 10 to 60 minutes.

*10. The coating composition of claim 1 wherein said mixture has a softening point between about 60° C. and about 120° C.*

*11. The coating composition of claim 1 wherein said mixture has a softening point between about 80° C. and about 110° C.*

*12. The coating composition of claim 1 wherein said mixture is a free-flowing powder having a particle size range of approximately 20–150 microns.*

*13. The coating composition of claim 1 wherein said dibasic aromatic carboxylic acid is ortho-phthalic acid, terephthalic acid, isophthalic acid, hexachlorophthalic acid, hexachlorophthalic anhydride, tetrahydrophthalic acid, tetrahydrophthalic anhydride, endomethylene-tetrahydrophthalic acid, endomethylene-tetrahydrophthalic anhydride, hexachloroendomethylene-tetrahydrophthalic acid, hexachloroendomethylene-orthophthalic anhydride, methanol esters of the above, or ethanol esters of the above.*

*14. The coating composition of claim 1 wherein the alcohol component (b) of the polyester is a glycidyl ester of saturated aliphatic monocarboxylic acids having 9 to 11 carbon atoms and having tertiary or quaternary carbon atoms in alpha-position to the carboxyl group.*

*15. The coating composition of claim 1 wherein the alcohol component (c) of the polyester is 2,2-dimethylpropanediol-1,3.*

*16. The coating composition of claim 1 wherein the polyester contains up to 10 mole percent (based on the total alcohol component) of an aliphatic trihydric or polyhydric alcohol.*

*17. The coating composition of claim 1 wherein the alkoxylated polyamine-aldehyde resin is a polyamine-aldehyde resin alkoxylated with one or more aliphatic alcohols having one to six carbon atoms.*

*18. A fusible pulverulent solid mixture prepared by bringing together alkoxylated polyamine-aldehyde resin and polyester resin having a softening point in the range of 60° C. to 130° C., and mixing said resins sufficiently at a temperature above the softening point thereof to form a homogeneous mixture while retaining said mixture in a thermosettable state, said mixture comprising 3 percent to 15 percent by weight of alkoxylated polyamine-aldehyde resin and 85 percent to 97 percent by weight of polyester resin having an acid number below 20 (A) of which the acid is a dibasic, aromatic carboxylic acid or a combination of said dibasic, aromatic carboxylic acid and up to 10 mole percent (based on the total dibasic aromatic carboxylic acid) of a polybasic aliphatic carboxylic acid or an at least tribasic aromatic carboxylic acid and (B) of which the alcohol is*

*(1) an alcohol component comprising*

*(a) from 0 to 100 mole % (based on the total alcohol component of the polyester) of an alcohol having the general formula:*

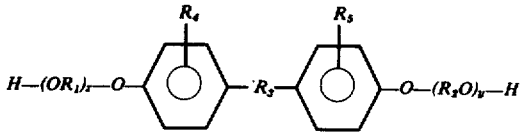

*in which $R_1$ and $R_2$ represent alkylene groups having from 2 to 4 carbon atoms, $R_3$ represents a group selected from alkylidene groups having 3 or 4 carbon atoms, a cycloalkylidene group having 6 carbon atoms, a carbonyl group and a sulphone group, x and y are numerals each being at least one, the sums of x and y being not greater than 6, $R_4$ and $R_5$ represent a group selected from hydrogen* atoms and alkyl radicals having from 1 to 6 carbon atoms;

(b) from 0 to 40 mole % (based on the total alcohol component of the polyester) of a glycidyl ester having the general formula:

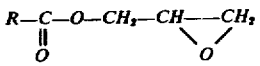

in which R represents a group selected from straight and branched chain, saturated and unsaturated alkyl groups having from 4 to 20 carbon atoms, a substituted benzene nucleus and an unsubstituted benzene nucleus, and (c) from 0 to 100 mole % (based on the total alcohol component of the polyester) of at least one dihydric, aliphatic alcohol, the sum of the alcohol components (a), (b), and (c) being 100 mole % (based on the total alcohol component of the polyester); or (2) a combination of said alcohol component and up to 10 mole percent (based on the total alcohol component of the polyester) of aliphatic trihydric or polyhydric alcohol, said curable coating composition having a good powder stability.

19. The coating composition of claim 18 wherein said mixture has a softening point between about 60° C. and about 120° C.

20. The coating composition of claim 18 wherein said mixture has a softening point between about 80° C. and about 110° C.

21. The coating composition of claim 18 wherein said mixture is a free-flowing powder having a particle size range of approximtely 20–150 microns.

22. The coating composition of claim 18 wherein said dibasic aromatic carboxylic acid is ortho-phthalic acid, terephthalic acid, isophthalic acid, hexachlorophthalic acid, hexachlorophthalic anhydride, tetrahydrophthalic acid, tetrahydrophthalic anhydride, endomethylene-tetrahydrophthalic acid, endomethylene-tetrahydrophthalic anhydride, hexachloroendomethylene-tetrahydrophthalic acid, hexachloroendomethylene ortho-phthalic anhydride, methanol esters of the above, or ethanol esters of the above.

23. The coating composition of claim 18 wherein the alcohol component (b) of the polyester is a glycidyl ester of saturated aliphatic monocarboxylic acids having 9–11 carbon atoms and having tertiary or quaternary carbon atoms in alpha-position to the carboxyl group.

24. The coating composition of claim 18 wherein the alcohol component (c) of the polyester is 2,2-dimethylpropanediol-1,3.

25. The coating composition of claim 18 wherein the alkoxylated polyamine-aldehyde resin is a polyamine-aldehyde resin alkoxylated with aliphatic alcohols having one to six carbon atoms.

26. The composition of claim 18 wherein the alkoxylated polyamine-aldehyde resin is methoxylated melamine formaldehyde resin.

27. A fusible pulverulent solid mixture prepared by bringing together methoxylated melamine formaldehyde resin and polyester resin having a softening point in the range of 60° C. to 130° C., and mixing said resins sufficiently at a temperature above the softening point thereof to form a homogeneous mixture while retaining said mixture in a thermosettable state, said mixture comprising methoxylated melamine formaldehyde resin and polyester in a weight ratio of polyester to polyamine-aldehyde between 90:10 and 95:5, and wherein said polyester has an acid number below 20 and a softening point falling within the range between 60° C. and 130° C., of which the acid component comprises a dibasic, aromatic carboxylic acid and of which the alcohol component comprises:

a. from 0 to 100 mole percent (based on the total alcohol component of the polyester) of an alcohol having the general formula:

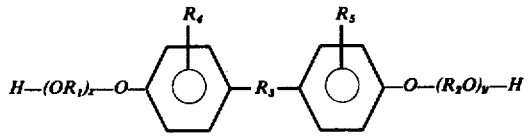

in which $R_1$ and $R_2$ represent alkylene groups having from two to four carbon atoms, $R_3$ represents a group selected from alkylidene groups having three or four carbon atoms, a cycloalkylidene group having six carbon atoms, a carbonyl group and a sulfone group x and y are numerals each being at least one, the sum of x and y being not greater than six, $R_4$ and $R_5$ represent a group selected from hydrogen atoms and alkyl radicals having from one to six carbon atoms;

b. from 0 to 40 mole percent (based on the total alcohol component of the polyester) of a glycidyl ester having the general formula:

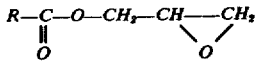

in which R represents a group selected from straight and branched chain, saturated and unsaturated alkyl groups having from four to 20 carbon atoms, a substituted benzene nucleus and an unsubstituted benzene nucleus, and c. from 0 to 100 mole percent (based on the total alcohol component of the polyester) of at least one dihydric, aliphatic alcohol, the sum of the alcohol components (a), (b) and (c) being 100 mole percent, said curable coating composition having a good powder stability.

28. The coating composition of claim 27 wherein said mixture has a softening point between about 60° C. and about 120° C.

29. A fusible pulverulent solid mixture prepared by bringing together alkoxylated polyamine-aldehyde resin and polyester resin having a softening point in the range of 60° C. to 130° C., and mixing said resins sufficiently at a temperature above the softening point thereof to form a homogeneous mixture while retaining said mixture in a thermosettable state, said mixture comprising alkoxylated polyamine-aldehyde and polyester in a weight ratio of polyester to polyamine-aldehyde between 90:10 and 95:5, and wherein said polyester has an acid number below 20

(A) of which the acid is dibasic aromatic carboxylic acid or a combination of said dibasic aromatic carboxylic acid and up to 10 mole percent (based on the total dibasic aromatic carboxylic acid) of a polybasic aliphatic carboxylic acid or an at least tribasic aromatic carboxylic acid and (B) of which the alcohol is:

(1) an alcohol component comprising:

a. from 0 to 100 mole percent (based on the total alcohol component of the polyester) of an alcohol having the general formula:

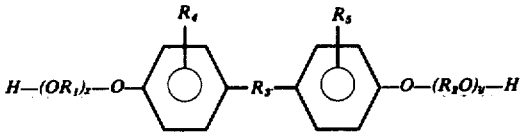

*in which $R_1$ and $R_2$ represent alkylene groups having from two to four carbon atoms, $R_3$ represents a group selected from a cycloalklidene group having six carbon atoms, a carbonyl group and a sulfone group, x and y are numerals each being at least one, the sum of x and y being not greater than six, $R_4$ and $R_5$ represent a group selected from hydrogen atoms and alkyl radicals having from one to six carbon atoms;*

*b. from 0 to 40 mole percent (based on the total alcohol component of the polyester) of a glycidyl ester having the general formula:*

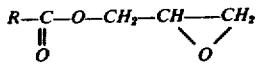

*in which R represent a group selected from straight and branched chain, saturated and unsaturated alkyl groups having from four to 20 carbon atoms, a substituted benzene nucleus and an unsubstituted benzene nucleus, and*

*c. from 0 to 100 mole percent (based on the total alcohol component of the polyester) of at least one dihydric, aliphatic alcohol, the sum of the alcohol components (a), (b) and (c) being 100 mole percent, (based on the total alcohol component of the polyester) or*

*(2) a combination of said alcohol component and up to 10 mole percent (based on the total alcohol component of the polyester) of aliphatic trihydric or polyhydric alcohol, said curable coating composition having a good powder stability.*

*30. The coating composition of claim 29 wherein the alkoxylated polyamine-aldehyde resin is methoxylated melamine-formaldehyde resin.*

*31. A fusible pulverulent solid mixture prepared by bringing together methoxylated polyamine-aldehyde resin and polyester resin having a softening point in the range of 67° C. to 110° C., and mixing said resins sufficiently at a temperature above the softening point thereof to form a homogeneous mixture while retaining said mixture in a thermosettable state, said mixture being suitable for application by electrostatic spray coating or fluidized bed coating and comprising methoxylated polyamine-aldehyde resin and polyester resin in a weight ratio of polyester to methoxylated polyamine aldehyde resin in the range of 97:3 to 85:15; said polyester resin having an acid number below 20 and being the esterification reaction product of acid comprising dibasic aromatic carboxylic acid and of alcohol which is:*

*a. up to 100 mole percent (based on the total alcohol in the polyester) of an alcohol having the general formula:*

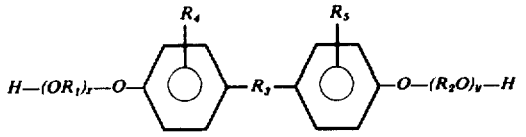

*in which $R_1$ and $R_2$ represent alkylene groups having from two to four carbon atoms, $R_3$ represents a group selected from alkylidene groups having three or four carbon atoms, a cycloalkylidene group having six carbon atoms, a carbonyl group and a sulfone group, x and y are numerals each being at least one, the sum of x and y being not greater than six, $R_4$ and $R_5$ represent a group selected from hydrogen atoms and alkyl radicals having from one to six carbon atoms; and*

*b. from 0 to 40 mole percent (based on the total alcohol in the polyester) of a glycidyl ester of lauric acid or glycidyl ester of branched chain monocarboxylic acids having 9 to 11 carbon atoms;*

*the sum of the moles of alcohol (a) and (b) representing 100 mole percent of all alcohol in the polyester.*

*32. A process for the preparation of coated substrates which comprises:*

*(I) applying to a substrate by powder-coating process a curable powder coating composition comprising a mixture of 3% to 15% by weight of an alkoxylated polyamine-aldehyde resin and 85% to 97% by weight of a polyster resin having an acid number below 20 and a softening point falling within the range between 60° C. and 130° C.,*

*(A) of which the acid is a dibasic, aromatic carboxylic acid and up to 10 mole percent (based on the total dibasic aromatic carboxylic acid) of a polybasic aliphatic carboxylic acid or an at least tribasic aromatic carboxylic acid and*

*(B) of which the alcohol is*

*(1) an alcohol component comprising*

*(a) from 0 to 100 mole % (based on the total alcohol component of the polyester) of an alcohol having the general formula:*

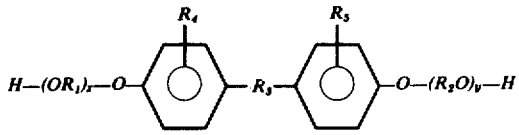

*in which $R_1$ and $R_2$ represent alkylene groups having from 2 to 4 carbon atoms, $R_3$ represents a group selected from alkylidene groups having 3 or 4 carbon atoms, a cycloalkylidene group having 6 carbon atoms, a carbonyl group and a sulphone group, x and y are numerals each being at least one, the sums of x and y being not greater than 6, $R_4$ and $R_5$ represent a group selected from hydrogen atoms and alkyl radicals having from 1 to 6 carbon atoms;*

*(b) from 0 to 40 mole % (based on the total alcohol component of the polyester) of a glycidyl ester having the general formula:*

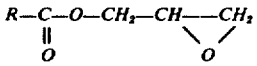

*in which R represent a group selected from straight and branched chain, saturated and unsaturated alkyl groups having from 4 to 20 carbon atoms, a substituted benzene nucleus and an unsubstituted benzene nucleus, and*

*(c) from 0 to 100 mole % (based on the total alcohol component of the polyester) of at least one dihydric, aliphatic alcohol, the sum of the alcohol* components (a), (b), and (c) being 100 mole % (based on the total alcohol component of the polyester); or (2) a combination of said alcohol component and up to 10 mole percent (based on the total alcohol component of the polyester) of aliphatic trihydric or polyhydric alcohol, said curable coating composition having a good powder stability;

(II) heating the coated substrate to a temperature of from 120° to 220° C. for 10 to 60 minutes.

33. The process of claim 32 wherein said coating process is an electrostatic powder spray-coating process and said coating composition has a particle size range of approximately 20–150 microns.

34. A process for the preparation of coated substrates which comprises (A) applying to a substrate by an electrostatic powder spray process a curable powder coating composition comprising a mixture of 3 percent to 15 percent by weight of an alkoxylated polyamine-aldehyde resin and 85 percent to 97 percent by weight of a polyester resin having an acid number below 20 and a softening point falling within the range between 60° C. and 130° C. of which the acid component comprises a dibasic aromatic carboxylic acid and of which the alcohol component comprises:

a. from 0 to 100 mole percent (based on the total alcohol component of the polyester) of an alcohol having the general formula:

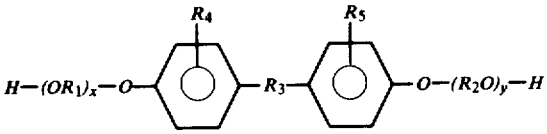

in which $R_1$ and $R_2$ represent alkylene groups having from two to four carbon atoms; $R_3$ represents a group selected from alkylidene groups having three or four carbon atoms, a cycloalkylidene group having six carbon atoms, a carbonyl group and a sulfone group, x and y are numerals each being at least one, the sum of x and y being not greater than six, $R_4$ and $R_5$ represent a group selected from hydrogen atoms and alkyl radicals having from one to six carbon atoms;

b. from 0 to 40 mole percent (based on the total alcohol component of the polyester) of a glycidyl ester having the general formula:

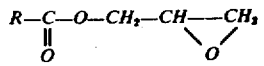

in which R represents a group selected from straight and branched chain, saturated and unsaturated alkyl groups having from four to 20 carbon atoms, a substituted benzene nucleus and an unsubstituted benzene nucleus, c. from 0 to 100 mole percent (based on the total alcohol component of the polyester) of at least one dihydric aliphatic alcohol, the sum of the alcohol components (a), (b) and (c) being 100 mole percent, said curable coating composition having a good powder stability; and having a particle-size range of approximately 20–150 microns; and (B) heating the coated substrate to a temperature of from 120° to 220° C. for 10 to 60 minutes.

35. A method of forming a heat-single layer of coating material on a substrate comprising applying to said substrate by electrostatic powder spray coating or fluidized bed powder coating, a powdery resin composition including polyester resin and methoxylated polyamine aldehyde resin in admixture in a weight ratio in the range of 97:3 to 85:15 and having a softening point in the range of 70°–104° C., said polyester having a softening point in the range of 67°–110° C. and an acid number of less than 20, and comprising the polyesterification product of aromatic dicarboxylic acid and at least one alcohol having two hydroxyl groups, said mixture having the property of flowing on melting to form a uniform film; melting said powder, forming a film and curing said film by heating to a temperature in the range of 120° C. to 220° C. for 10 to 60 minutes; said coating material being sufficiently flexible so that a 50 micron thick layer thereof which has been cured for 30 minutes at 180° C. on a 1 millimeter thick steel test panel will not fail when bent 180° over a ¾ inch mandrel; and said coating material also having a shock resistance of at least 2–3 mm as determined by German test specification DIN 53,156 using a coating and test panel prepared as described in connection with the foregoing flexibility test.

36. A method in accordance with claim 35 wherein the methoxylated polyamine aldehyde resin is methoxylated melamine formaldehyde resin.

37. A method in accordance with claim 35 wherein the polyester and methoxylated polyamine aldehyde resin are present in a weight ratio in the range of 95:5 to 90:10.

* * * * *